(12) United States Patent
Egsgaard

(10) Patent No.: US 9,987,674 B2
(45) Date of Patent: Jun. 5, 2018

(54) MANUFACTURE OF WHEELS

(71) Applicant: GKN Land Systems Limited, Redditch, Worcestershire (GB)

(72) Inventor: Eigil Egsgaard, Billund (DK)

(73) Assignee: GKN Land Systems Limited, Redditch, Worcestershire (GB)

( * ) Notice: Subject to any disclaimer, the term of this patent is extended or adjusted under 35 U.S.C. 154(b) by 221 days.

(21) Appl. No.: 14/413,079

(22) PCT Filed: Jul. 2, 2013

(86) PCT No.: PCT/GB2013/051750
§ 371 (c)(1),
(2) Date: Jan. 6, 2015

(87) PCT Pub. No.: WO2014/009695
PCT Pub. Date: Jan. 16, 2014

(65) Prior Publication Data
US 2015/0165510 A1 Jun. 18, 2015

(30) Foreign Application Priority Data
Jul. 13, 2012 (GB) .................................. 1212523.3

(51) Int. Cl.
*B21D 53/30* (2006.01)
*B21J 5/08* (2006.01)
(Continued)

(52) U.S. Cl.
CPC ............... *B21D 53/30* (2013.01); *B21J 5/08* (2013.01); *B21J 9/08* (2013.01); *B21K 1/38* (2013.01);
(Continued)

(58) Field of Classification Search
CPC ...... B21D 22/022; B21D 37/16; B21D 53/26; B21D 53/264; B21D 53/265; B21D 53/30;
(Continued)

(56) References Cited

U.S. PATENT DOCUMENTS 2,452,974 A * 11/1948 Westin ....................... B21J 9/08
219/151
3,572,180 A * 3/1971 Beaumont ................ B21K 1/28
72/364
(Continued)

FOREIGN PATENT DOCUMENTS

CN 2621382 6/2004
CN 101982291 3/2011
(Continued)

OTHER PUBLICATIONS

CN Appln. No. 201380036528.8, First Office Action dated Jan. 4, 2016, 6 pages (English Translation, 10 pages).
(Continued)

Primary Examiner — Edward Tolan
(74) Attorney, Agent, or Firm — Boyle Fredrickson, S.C.

(57) ABSTRACT

A method of making at least a component for a rim base of a multi-piece wheel for a vehicle, comprising providing a workpiece of tubular configuration and hot upset forging the workpiece in press tooling to form a part thereof to a required configuration, wherein the part of the workpiece is heated to a forging temperature in situ in the press tooling, preferably by induction heating.

24 Claims, 13 Drawing Sheets

(51) Int. Cl.
  *B21J 9/08* (2006.01)
  *B21K 1/38* (2006.01)
  *B60B 21/02* (2006.01)

(52) U.S. Cl.
  CPC ...... *B60B 21/026* (2013.01); *B60B 2310/208* (2013.01); *B60B 2310/50* (2013.01); *Y10T 29/49529* (2015.01)

(58) Field of Classification Search
  CPC ......... B21J 1/06; B21J 5/02; B21J 5/08; B21J 9/08; B21J 5/06; B21K 1/28; B21K 1/38; B60B 2310/208; B60B 2310/302; Y10T 29/49529
  See application file for complete search history.

(56) References Cited

U.S. PATENT DOCUMENTS

| | | | | |
|---|---|---|---|---|
| 3,698,219 | A * | 10/1972 | Moore | B21J 1/06 72/342.8 |
| 3,780,553 | A * | 12/1973 | Athey | B21J 13/02 72/342.8 |
| 3,842,644 | A * | 10/1974 | Biesmans | B21J 5/08 219/637 |
| 4,050,135 | A * | 9/1977 | Luedi | B21D 53/30 29/894.353 |
| 4,144,433 | A | 3/1979 | Zelahy et al. | |
| 4,192,167 | A | 3/1980 | Huebner et al. | |
| 4,437,326 | A * | 3/1984 | Carlson | B21D 26/043 72/364 |
| 4,528,734 | A * | 7/1985 | Beyer | B21K 1/28 29/894.324 |
| 5,536,337 | A * | 7/1996 | Wei | B60B 3/06 148/508 |
| 6,372,063 | B1 * | 4/2002 | Grillon | B21J 5/004 148/320 |
| 6,886,250 | B2 * | 5/2005 | Liao | B21J 1/06 29/894.324 |
| 2003/0000270 | A1 * | 1/2003 | Carolan | B21D 26/031 72/62 |
| 2010/0236317 | A1 * | 9/2010 | Sigelko | B21D 37/16 72/356 |
| 2012/0138199 | A1 * | 6/2012 | Greubel | B21J 5/08 148/653 |

FOREIGN PATENT DOCUMENTS

| | | | | |
|---|---|---|---|---|
| CN | 101468370 | | 3/2012 | |
| DE | 2812803 | | 11/1982 | |
| EP | 1702695 | | 12/2009 | |
| FR | 2393630 | | 1/1979 | |
| GB | 340290 | | 12/1930 | |
| GB | 366024 | | 1/1932 | |
| GB | 550186 | A * | 12/1942 | ............... B21J 9/08 |
| GB | 569780 | | 6/1945 | |
| GB | 772103 | | 4/1957 | |
| GB | 971258 | | 9/1964 | |
| GB | 1057066 | | 2/1967 | |
| JP | 5-76978 | A * | 3/1993 | ............. B21J 13/02 |
| RU | 2039626 | | 7/1995 | |
| RU | 2003113479 | | 9/2005 | |
| RU | 117296 | | 6/2012 | |
| SU | 1181758 | | 9/1985 | |
| SU | 1234019 | | 5/1986 | |
| SU | 1243878 | | 7/1986 | |
| SU | 1391771 | | 4/1988 | |
| WO | 2006124005 | | 11/2006 | |

OTHER PUBLICATIONS

GB1212523.3, Search Report dated Aug. 28, 2012, 2 pages.
PCT/GB2013/051750, International Search Report dated Apr. 10, 2014, 5 pages.
Russian Appln. No. 2015101569/02, Examination Report dated Jun. 12, 2016, 9 pages and English translation of Comments (3 pages).

* cited by examiner

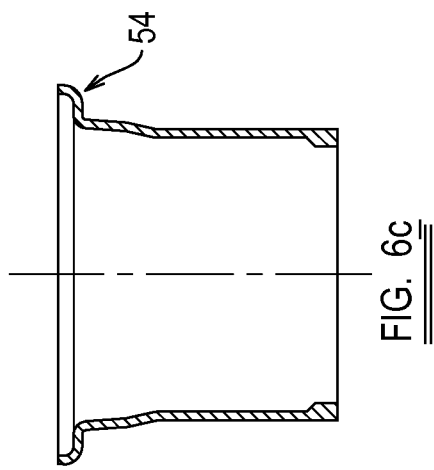
FIG. 6c
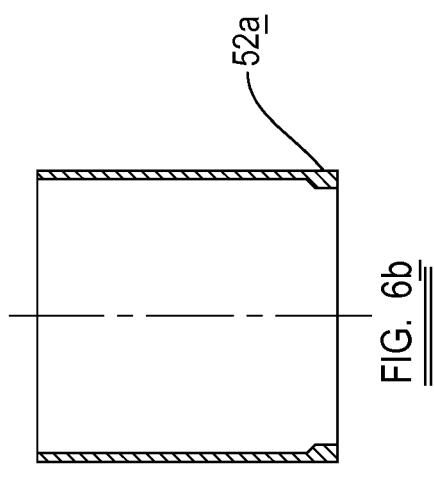
FIG. 6b
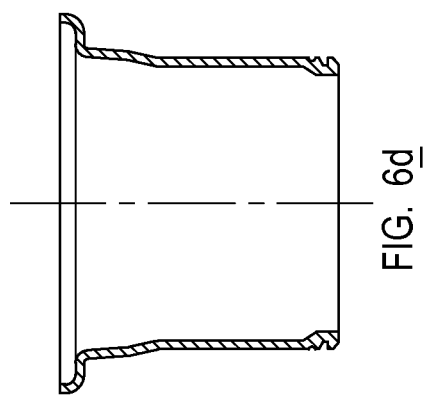
FIG. 6d
FIG. 6
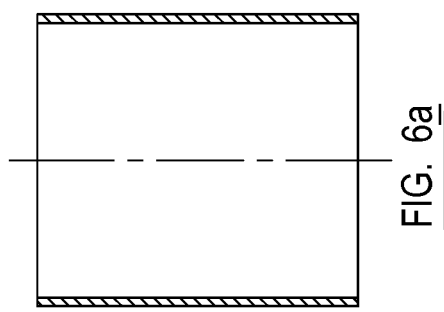
FIG. 6a

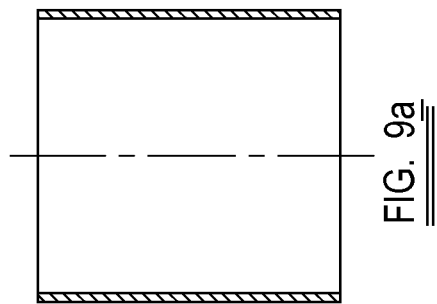
FIG. 9a
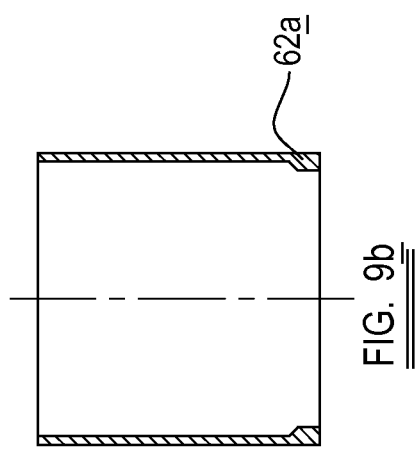
FIG. 9b
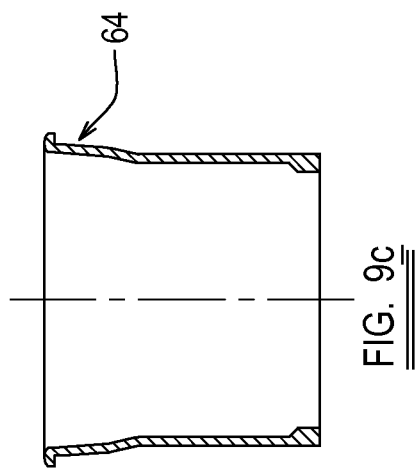
FIG. 9c
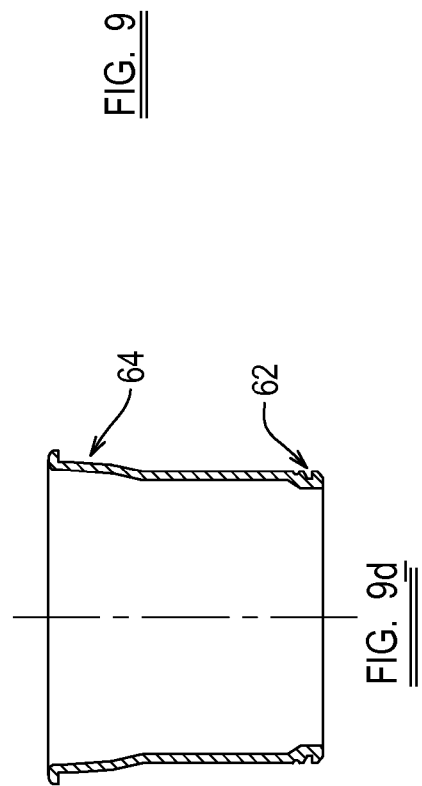
FIG. 9d
FIG. 9

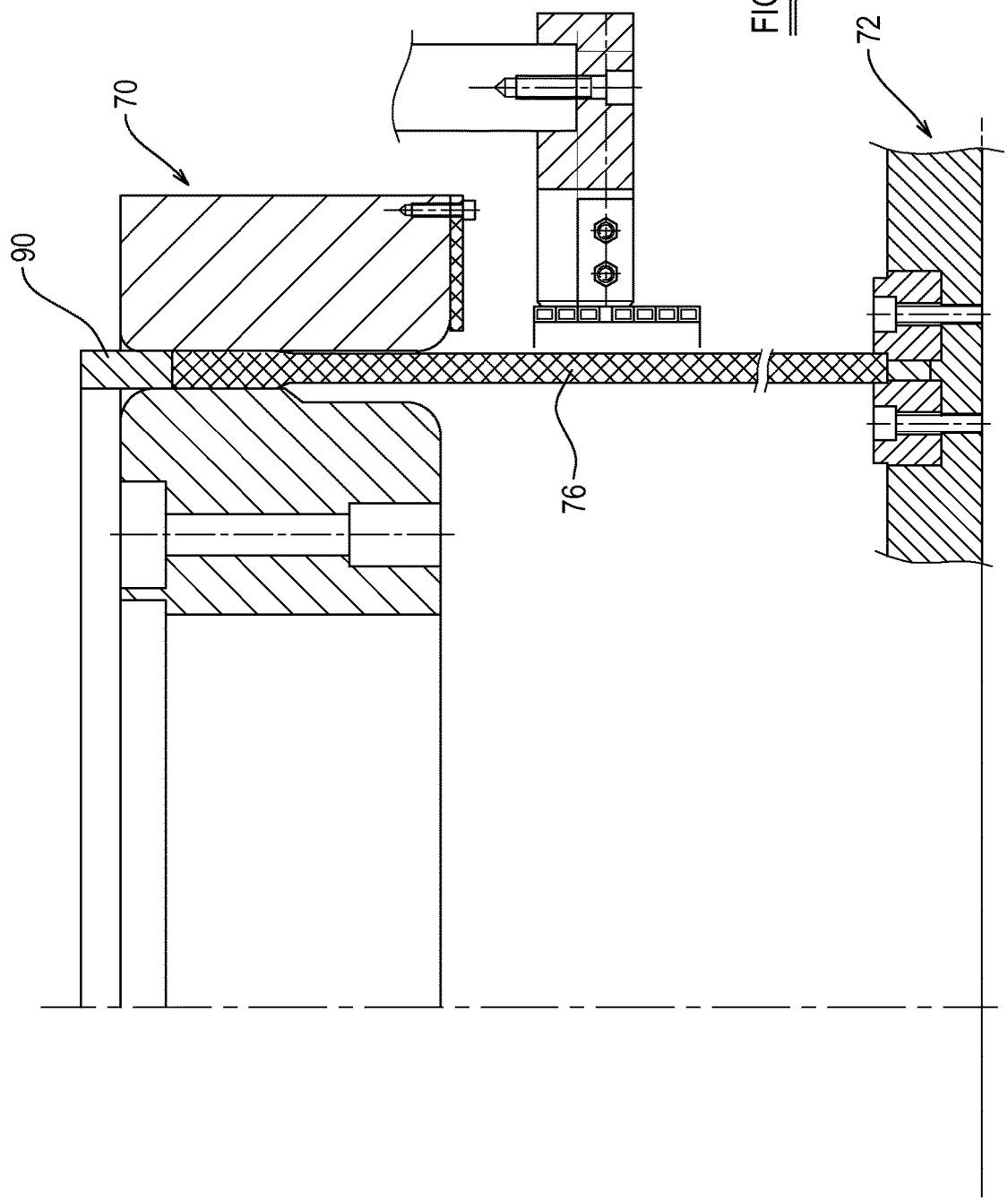

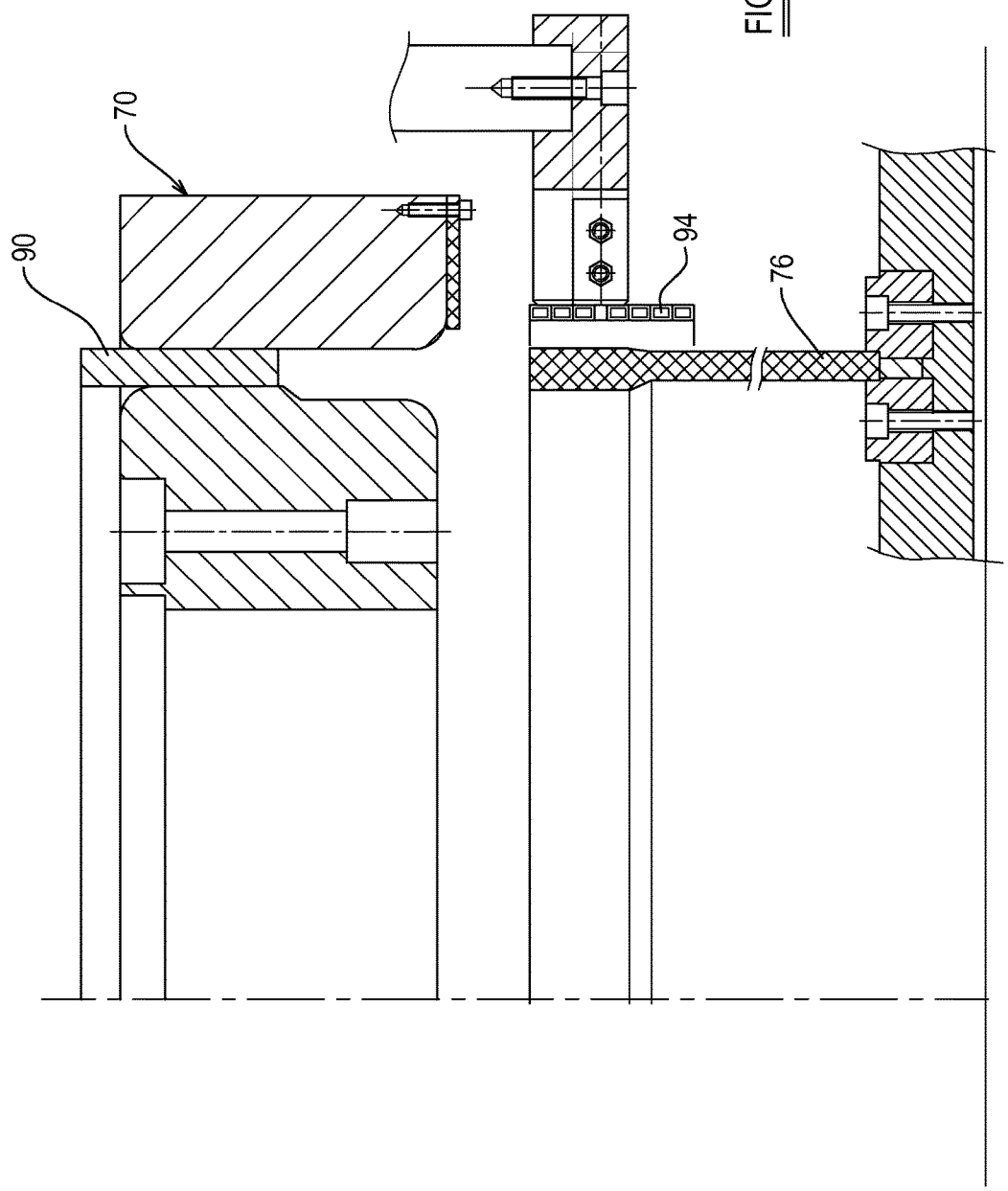

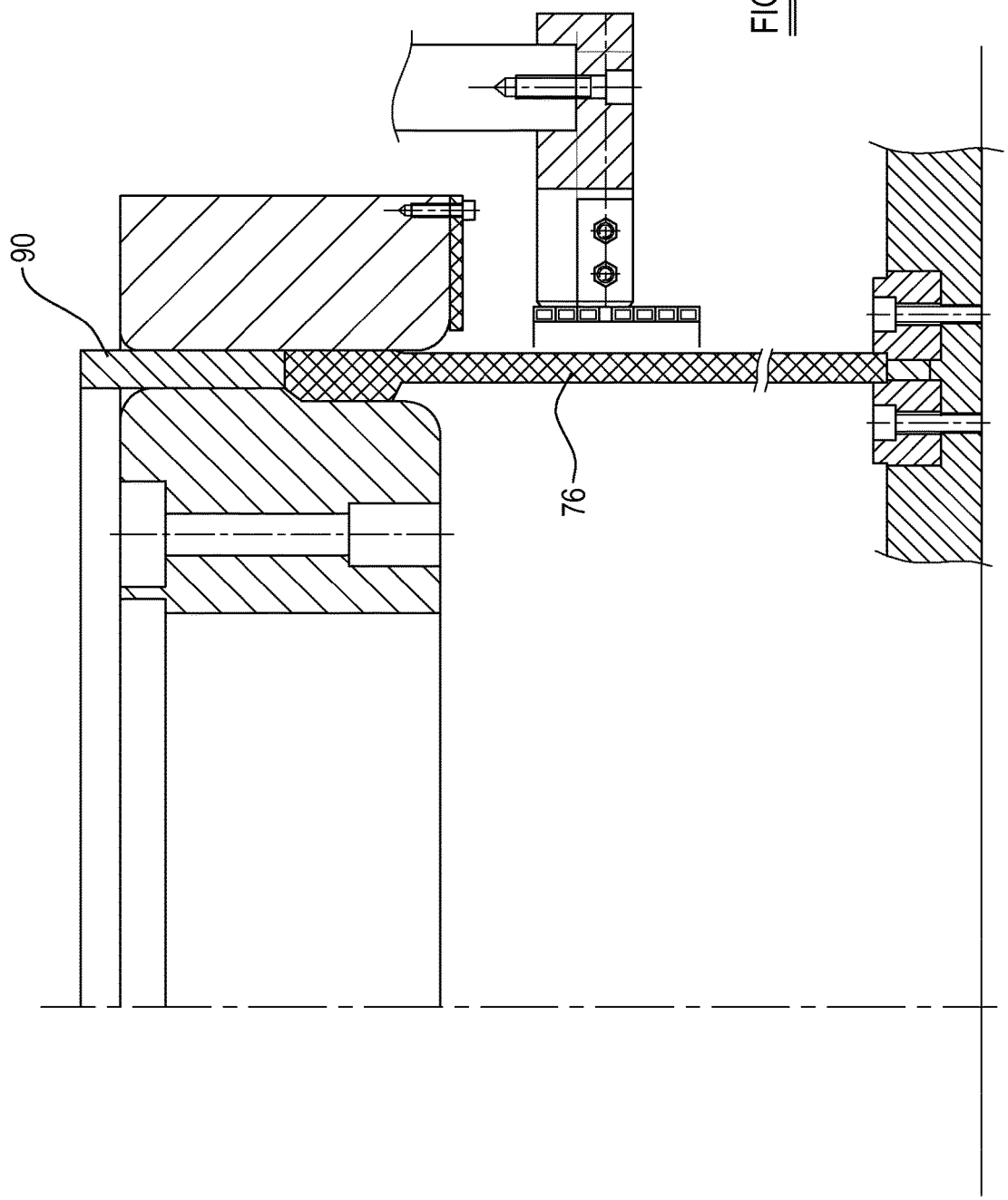

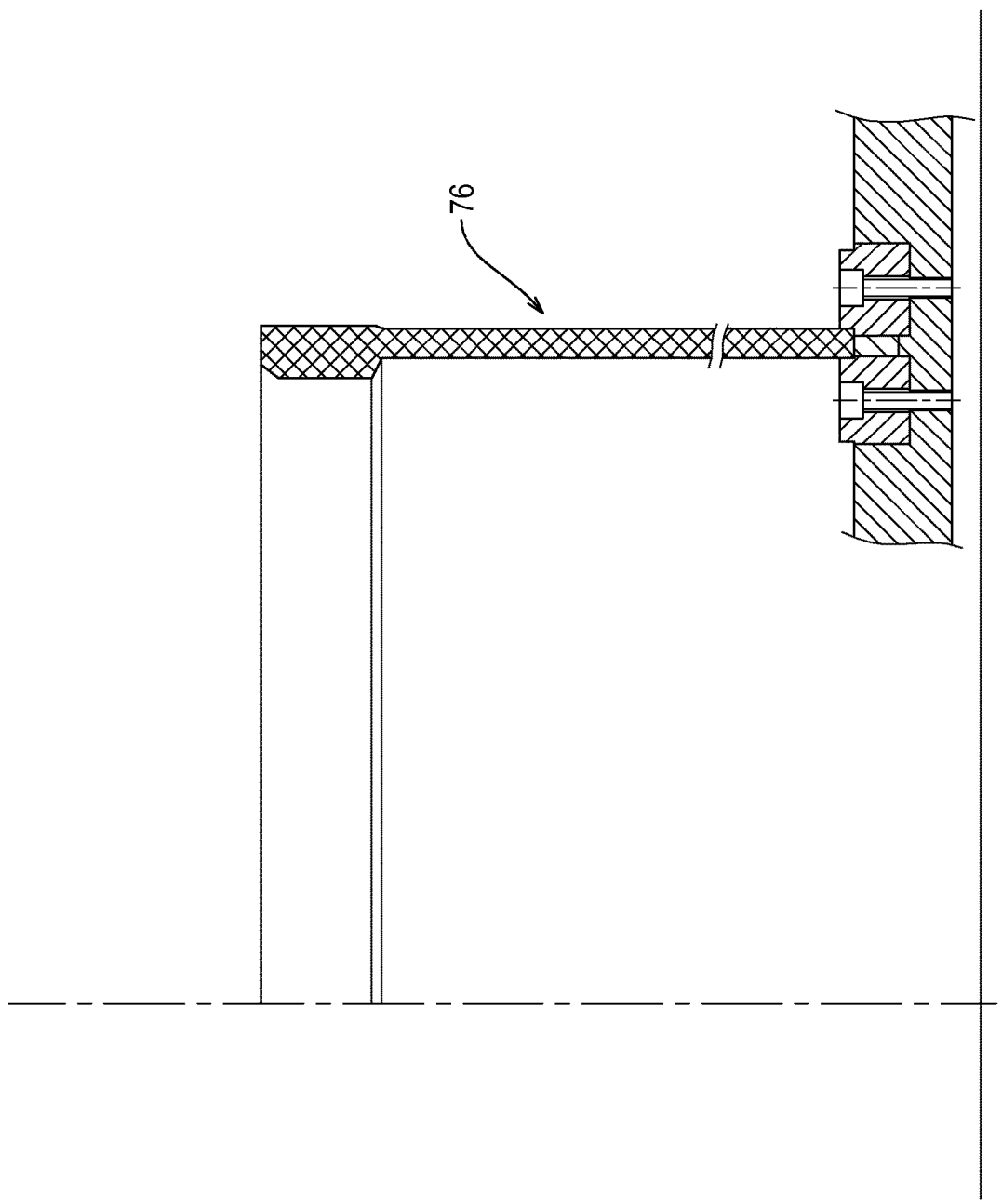

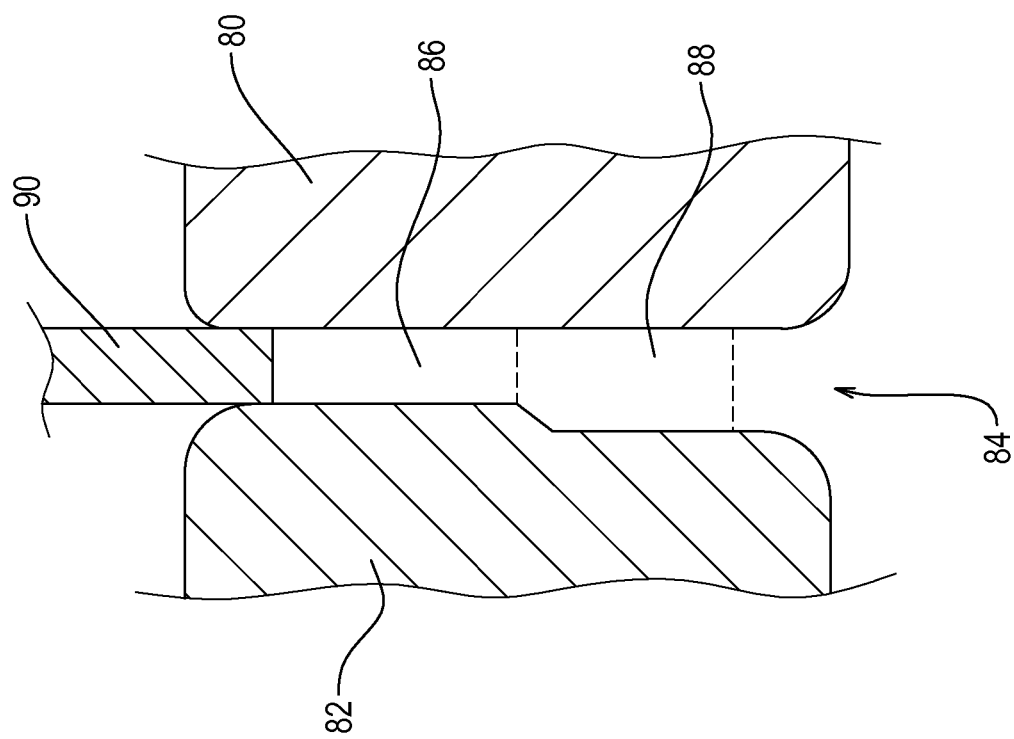

MANUFACTURE OF WHEELS

This invention relates to the manufacture of wheels for vehicles.

More particularly the invention relates to the manufacture of multi-piece wheels for heavy vehicles (e.g. mining, construction, earth moving, farming vehicles), wherein the rim of the wheel has one or both of its parts towards the axial ends of the rim, with which parts the respective bead portions and adjacent side wall portions of a tyre fitted to the wheel engage, removable to facilitate fitting of the tyre to the wheel and removal of the tyre from the wheel. It will be appreciated that for such large vehicles, having correspondingly large wheels, it is common for a tyre to be fitted or removed from a wheel while the wheel itself remains fitted to the vehicle.

It is to be understood that when we used the terms "radially", "axially", and cognate expressions, they are used with reference to the axis about which the wheel is rotatable in use.

Wheels of the type with which the invention is concerned are commonly three-piece wheels or five-piece wheels. In each case the rim comprises a rim base, provided at one axial end (which normally will be the innermost end of the wheel when the wheel is fitted to a vehicle, i.e. nearest the centre line of the vehicle), with either (in the case of a three-piece wheel) an integrally-formed flange which supports the side wall of a tyre in a region radially inwardly of the tyre, adjacent the bead at the innermost end of the tyres side wall, or (in the case of a five piece wheel) an abutment surface facing axially of the rim towards the other end thereof, for abutment by a separate component affording such a flange formation. Adjacent such flange formation or abutment surface the rim base has a radially outwardly facing, bead seat surface for engagement with the respective bead of the tyre. More commonly the bead seat surface is of tapering configuration, but a non-drive wheel may have a bead seat surface which is parallel to the wheel's axis, i.e. cylindrical.

At the other axial end of the rim the rim is adapted to receive a bead seat component, with a radially outwardly facing surface for engagement with the other bead of the tyre, and a flange formation for engagement with the adjacent radially innermost part of the other side wall of the tyre, the flange formation either being integral with the bead seat component or a separate component carried by the bead seat component. For retaining such a bead seat component, a retaining ring is used, engaging in a radially outwardly facing groove formation provided adjacent the free axial end of the rim base, the retaining ring being abutted by the bead seat component. Such a part of the rim base is commonly, and will herein, be termed the gutter portion, and may have a further radially outwardly facing groove for receiving a sealing ring to ensure air-tightness between the rim base and the bead seat member at that end of the rim.

Hitherto the rim base for such multi-piece wheels has been made as an assembly of multiple parts, secured to one another by welding therebetween around the circumference of the rim base. Commonly three separate such parts have been utilised, namely a gutter band part which constitutes the gutter band portion of the complete rim base, a back band part which forms the part of the opposite axial end of the rim base, and a centre band part therebetween, there being two circumferential welds to secure the three components together in the rim base. Sometimes the centre band part may itself comprise two components welded together. It is to be understood that when we refer herein to a centre band part, it means that it is between the gutter band and back band parts, and not that it is necessarily exactly at the geometrical centre of the rim base midway between its two axial ends.

Hitherto the components of such a rim base have generally being manufactured as follows. The centre band part has been made of steel plate, cut to width, rolled to a cylindrical configuration and its adjacent ends butt-welded together. Subsequently it has been machined at its axial ends, to a suitable configuration to co-operate with the other components to enable it to be securely welded thereto. The back band part has also been made of steel plate, cut to width and rolled to cylindrical configuration, welded, then pressed to provide it with a flange formation at that end of the rim base and machined preparatory for welding to the centre band part. Alternatively, to provide an abutment formation for engagement with a separate component affording the flange formation, an appropriately-sized and shaped steel profile is rolled to circular configuration and welded, pressed and then possibly machined to a suitable cross-sectional shape where it is to be welded to the centre band part. The gutter band part also may be formed from a profiled strip of steel having the grooves for the retaining ring and sealing ring formed therein, such a strip being rolled to circular configuration and welded, followed, if necessary, by machining preparatory to welding to the central band part.

Such methods of manufacture present certain disadvantages, primarily in terms of the costs involved in the above processes of forming the separate parts and welding them together. In addition, the welds between the components provide potential points for crack initiation which can lead to failure, and potential points for air leakage. Further, the detailed design of the profile (cross-sectional shape) of a rim is dependent on the availability of suitable standard profiles to make the respective band parts. If non-standard profiles are utilised, they are expensive to obtain and a high cost is incurred by maintaining stocks thereof.

It has been possible to manufacture a rim base in a single piece, using a spinning forming process, but this entails a high capital expenditure for tooling, and the forming of the rim subjects the material to a high degree of deformation hardening, so the rim base has a lowered resistance to fatigue and overloading.

Accordingly, it is broadly the object of the present invention to address the above-described disadvantages of known rim base manufacturing methods.

According to one aspect of the invention we provide a method of making at least a component for a rim base of a multi-piece wheel for a vehicle, comprising providing a workpiece of tubular configuration and hot upset forging the workpiece in press tooling to form a part thereof to a required configuration, wherein the part of the workpiece is heated to a forging temperature in situ in the press tooling, preferably by induction heating.

Preferably the press tooling includes a first part which holds the workpiece and a second part moveable relative thereto, and an induction heating element moveable with the second part, the method comprising moving the second part to a position relative to the first part to bring the induction heating element to a position adjacent the part of the workpiece to be formed, energising the induction heating element to heat the part of the workpiece, and further moving the second part of the tooling relative to the first part to effect upset forging of the part of the workpiece.

The upset forging may increase the thickness of an edge portion of the workpiece. This may provide a gutter band part of a rim base. In this case, the edge portion of the workpiece may subsequently be machined to provide at least a radially outwardly facing groove for engagement by a retaining ring for a tyre bead seat element. The remainder of the workpiece may provide a centre band part of a rim base.

Alternatively, the edge portion of the workpiece may be upset forged to provide an abutment formation for engagement by a flange element, i.e. the upset forging may provide a back band part of a rim base. A bead seat portion may be provided adjacent the abutment formation, and possibly a centre band portion.

It would be possible to utilise the method according to the invention, most broadly, to manufacture separate gutter band and/or back band parts which may be incorporated in a rim base by welding to one another, or possibly to an interposed centre band part. A gutter band part or back band part, made according to the invention may be welded in a rim base to a back band part or gutter band part, as the case may be, which is not manufactured by the method according to the invention. For example, a back band part for a three-piece wheel rim base may have been manufactured by pressing to provide it with a flange formation and adjacent bead seat portion. In this case, the invention still represents an advantage over known production methods as described above for a multi-part rim base, in terms of not requiring the initial supply of specially-profiled strips of steel.

A workpiece which has been hot upset forged in accordance with the invention may be subject to other manufacturing processes in order to produce a component ready for incorporation in a wheel rim base. As above mentioned, a gutter band part may be subsequently machined to provide it with the radially outwardly facing grooves for engagement by a retaining ring and a sealing element. Upset forging may be used to provide an increase in wall thickness of a part of the workpiece which is subsequently subject to cold forming or pressing to make a flange formation. This may be used to achieve a local variation in wall thickness of the pressed part, to strengthen it where required.

Preferably, however, a one-piece rim base may be made in accordance with the invention.

To this end, a workpiece of tubular configuration may be upset forged in accordance with the method of the invention to provide, at one edge of the workpiece, a gutter band part or a back band part of the rim base. Subsequently, the workpiece having its one edge upset forged may be upset forged at its other edge to provide the other band part, i.e. the back band or gutter band as the case may be, of the rim base.

The respective upset forging operations on the two edges of the workpiece conveniently may be carried out in separate press tool sets, comprising parts shaped to form the respective parts of the workpiece and each provided with a heating element positioned to effect heating of the respective workpiece part.

Thus, the complete manufacture of a rim base may comprise forming a workpiece of steel plate, cut to width, rolled to a cylindrical configuration, and welded to form a ring; placing the workpiece in a first press tool set wherein it is induction heated and upset forged to produce one of the back band and gutter band parts, removing the workpiece from that tool set and placing it in a further press tool set wherein it is heated and upset forged to provide the other of the back band and gutter band parts. Subsequently, the formed workpiece may be machined to provide the groove or grooves in the gutter band part thereof, and subjected to any other machining to provide further features of the rim base.

According to another aspect of the invention, we provide a rim base for a multi-piece wheel, having at least one component made by a method according to the first aspect of the invention.

Preferably the rim base has both a back band part and a gutter band part in accordance with the first aspect of the invention. More preferably, the rim base has back band, centre band, and gutter band parts which are integral with one another, the back band and gutter band parts being forged to the required configuration in accordance with the method of the invention.

According to another aspect of the invention, we provide a multi-piece wheel having a rim base according to the second aspect of the invention.

According to yet another aspect of the invention, we provide press tooling for use in the method according to the first aspect of the invention, the press tooling comprising first and second parts moveable relative to one another for upset forging a workpiece held in the tooling, wherein a heating element, preferably an induction heating element, is held in relation to the tooling so as to be able to effect local heating of a part of the workpiece which is to be upset forged.

Preferably the first and second parts of the press tooling comprise a static part which holds the workpiece and a second part moveable relative thereto to effect upset forging thereof, and the induction heating element is supported so as to be moveable with the second part of the tooling.

The induction heating element may be supported by the second part of the tooling. A shielding element may be interposed between an induction heating element and the second part of the tooling, to resist heating of the tooling element by the induction heating element and assist in effective heating of the workpiece.

In providing a method and tooling intended for making at least a component of a rim base of a multi-piece wheel, it will be understood that the principles of the invention may be applicable more generally in making other components. Thus, according to yet a further aspect of the invention, the invention provides a method of making an article by hot upset forging a workpiece in press tooling, wherein a part of the workpiece to be upset forged is heated to a forming temperature in situ in the press tooling by induction heating.

The invention will now be described by way of example with reference to the accompanying drawings, of which:

FIG. 6 illustrates successive production stages of the wheel rim base of FIG. 5;

FIG. 9 is an illustration of successive stages of production of the wheel rim base of FIG. 7;

FIG. 11 is an enlargement of part of the tooling shown in FIG. 10.

Figure 1:
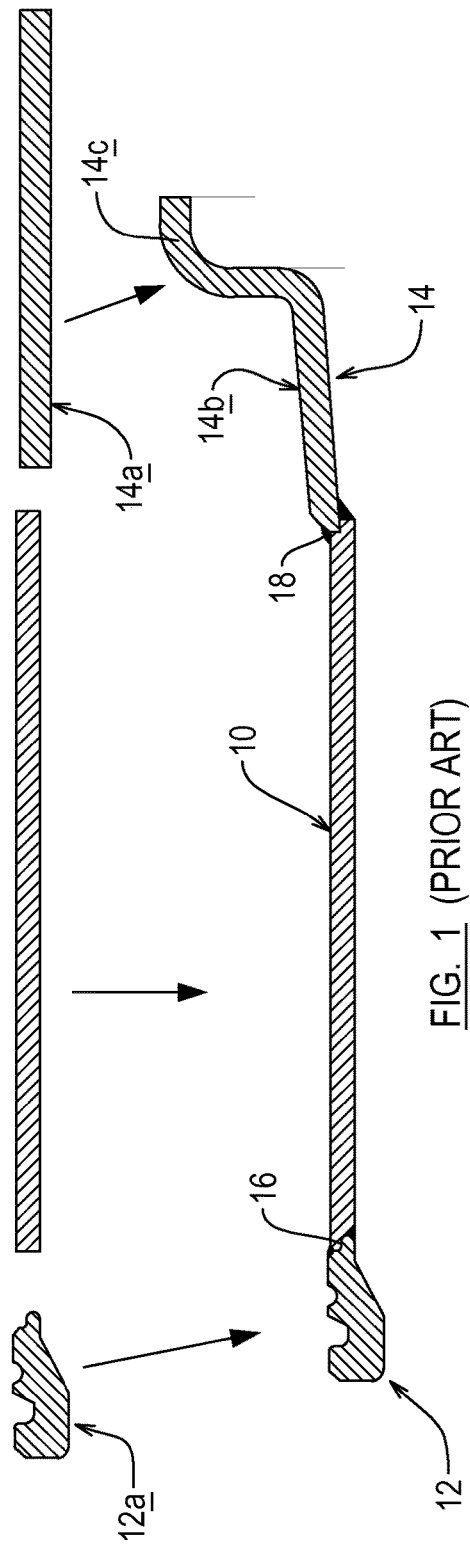
FIGS. 1 and 2 are cross sectional views through prior art rim bases, respectively for a three piece wheel and for a five piece wheel showing the components from which they are made.

Referring firstly to FIG. 1 of the drawings, this shows a prior art rim base for a three piece wheel. It comprises three components welded together, namely a centre band 10, a gutter band 12, and a back band 14. The centre band 10 is a cylindrical tube, made from a steel plate, cut to the required length and width, rolled into circular form, and welded between abutted ends of the plate to form a closed ring. The gutter band 12 is made from a steel strip whose profile is as indicated at 12a, cut to length, rolled into circular form, and welded to form a ring. The back band 14 is made from a slightly thicker steel plate than that of the centre band, as indicated at 14a, cut to length and width, rolled into circular form and welded to form a ring, and then subjected to a pressing operation to bring it to the configuration shown at 14, including a tyre bead seat portion 14b and an adjacent flange formation 14c to be engaged by the side wall of a fitted tyre, adjacent the tyre bead.

All the above-described components are machined to inter-fit with one another when placed together axially, and then welded together along two circumferentially extending weld lines 16, 18, respectively between the gutter band 12 and centre band 10, and between the centre band 10 and back band 14.

Figure 2:
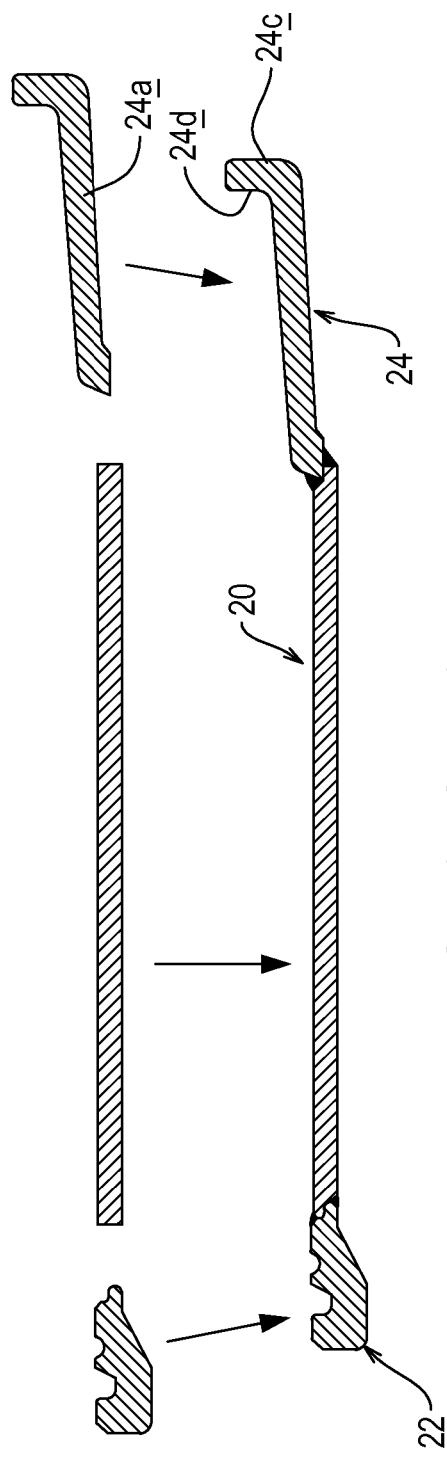

FIG. 2 shows a prior art rim base for a five piece wheel. As for the embodiment of FIG. 1, it comprises a centre band 20, a gutter band 22 and back band 24. The centre band 20 and gutter band 22 are manufactured in the same way as the corresponding components in the embodiment of FIG. 1. The back band 24 differs in that it is made out of a generally L-section steel strip 24a, which is cut to length, rolled to circular configuration, and welded to form a ring. Instead of the flange formation 14c of the three-piece wheel, it has an abutment portion 24c affording an abutment surface 24d which is engaged by a separate flange component, not shown. The three band components 20, 22, 24 are machined to interfit with one another, and welded together in the same manner as the band components in the embodiment of FIG. 1.

Figure 3:
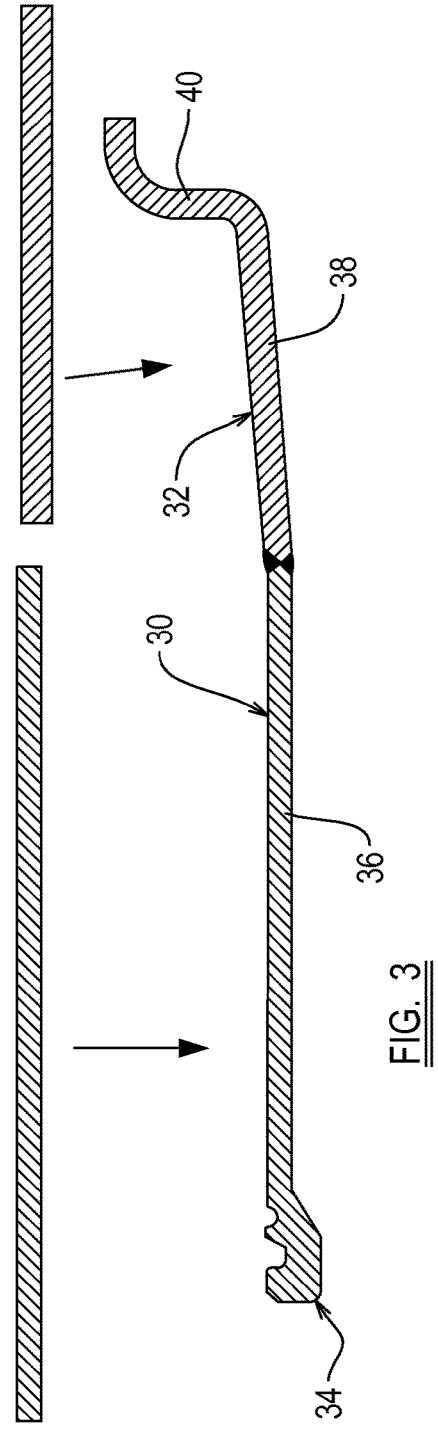
FIG. 3 is a cross sectional view through a first embodiment of wheel rim base made in accordance with the invention, for a three piece wheel.

Referring now to FIG. 3 of the drawings, this shows a rim base for a three-piece wheel including a component, namely a gutter band part, made in accordance with the invention. This rim base comprises a first component 30 and a second component 32. Both components are made from steel plate, cut to width and length, cold-rolled to form a hollow cylinder, welded to form a ring, and then formed to the required cross sectional shape. The component 30 is a gutter band part, upset forged by the method of the present invention to provide it with a gutter band portion indicated generally at 34, extending from the end of a centre band portion 36. The component 32 is pressed to the required cross sectional shape, including a bead seat portion 38 having a flange formation 40 at its end. Both components are machined as required and then welded together, the machining including, in the case of the gutter band portion 34, the provision of the radially outwardly facing grooves therein for co-operation with a retaining ring and sealing ring.

Figure 4:
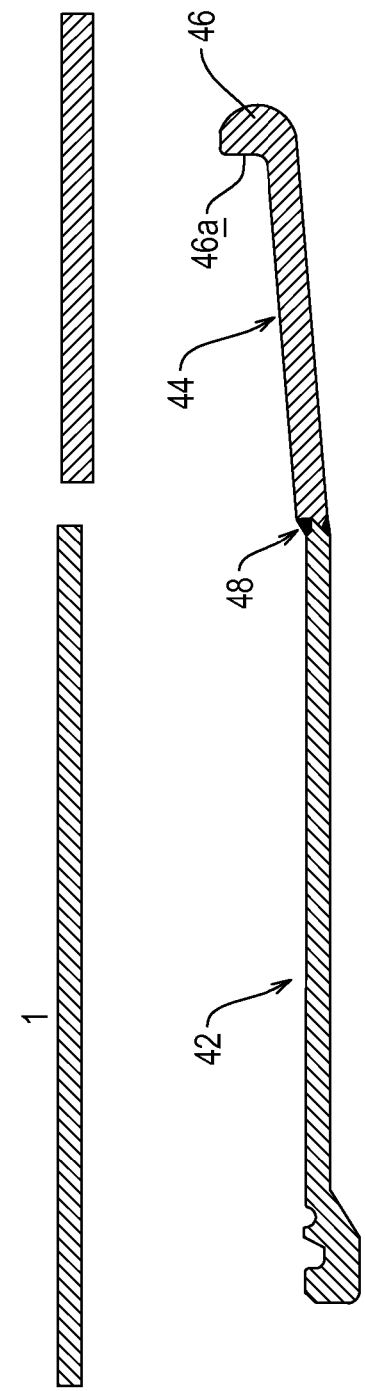
FIG. 4 is a cross sectional view through a wheel rim base in accordance with another embodiment of the invention, for a five piece wheel.

The rim base shown in FIG. 4 for a five piece wheel comprises two components 42, 44, both of which are manufactured by the method of the present invention. The component 42 is as the component 30 in the embodiment of FIG. 3, while the component 44, which also is made from steel plate cut to the required width and length, cold rolled into circular configuration, welded to form a ring, is upset forged by the method of the invention to provide it with an abutment formation 46 with an abutment surface 46a facing axially towards the other end of the rim base. Both components are machined as required, then welded at a circumferentially extending weld line 48.

Figure 5:
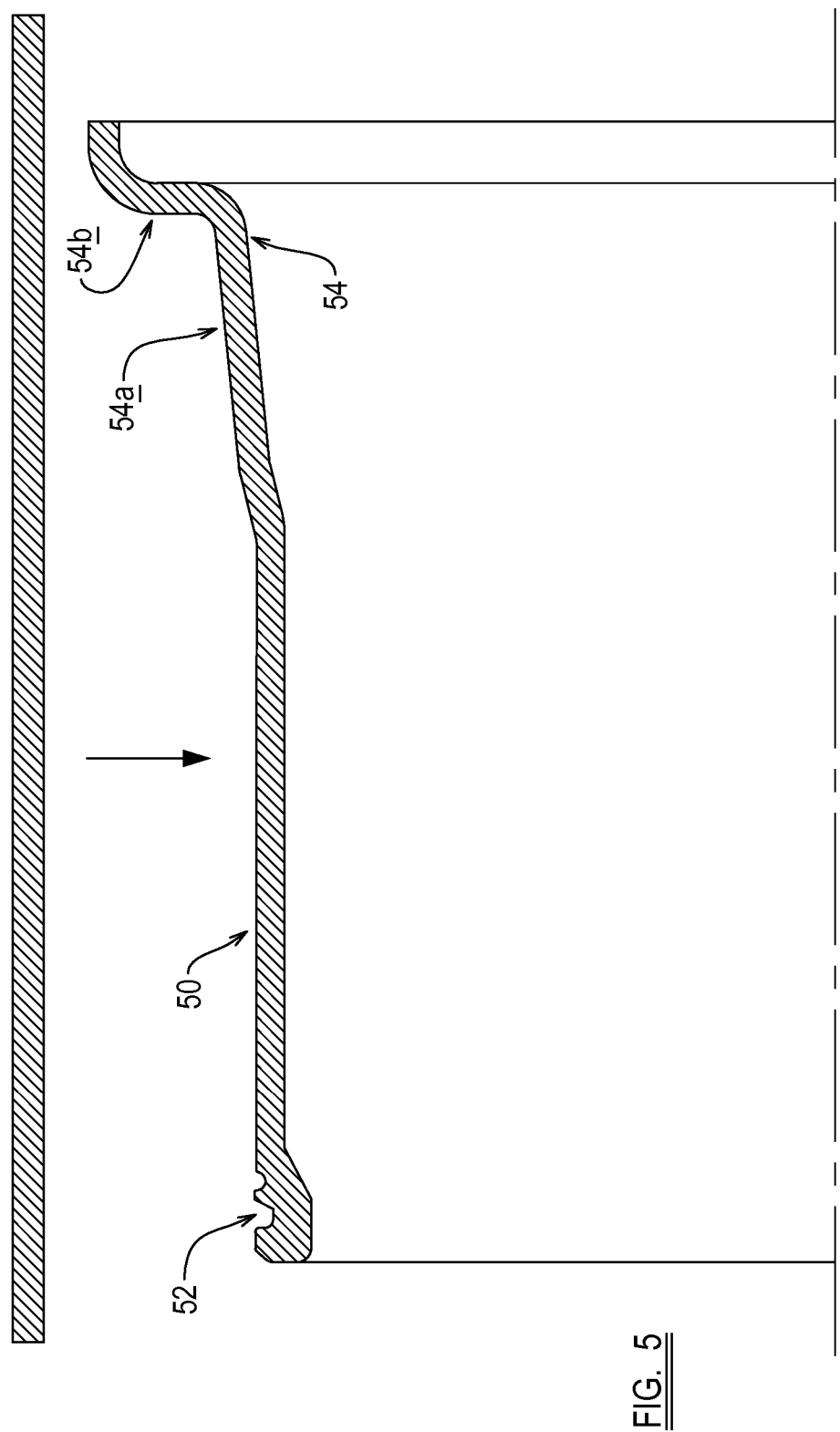
FIG. 5 is a cross sectional view of a further embodiment of wheel rim base in accordance with the invention for a three piece wheel.

Referring now to FIGS. 5 and 6 of the drawings, these show a rim base for a three piece wheel, made in one piece including a part formed by a method of the invention. The rim base comprises integral centre band (50), gutter band (52), and back band (54) parts, the last mentioned including a bead seat portion 54a and flange portion 54b. It is manufactured by, firstly, cutting steel plate to width and length, cold rolling it to circular configuration, and welding the adjacent end thereof to form a hollow cylindrical workpiece (FIG. 6A). Subsequently one end of the workpiece is hot upset forged by the method of the invention to provide its end portion with a region of increased thickness (52a, FIG. 6B). Next, the back band portion 54 is cold formed by pressing to the configuration shown in FIG. 5 having the bead seat and flange portions, as shown in FIG. 6C. Finally, as shown in FIG. 6D, the portion 52a of increased thickness is machined to give the final configuration of the gutter band portion 52 as shown in FIG. 5.

Figure 7:
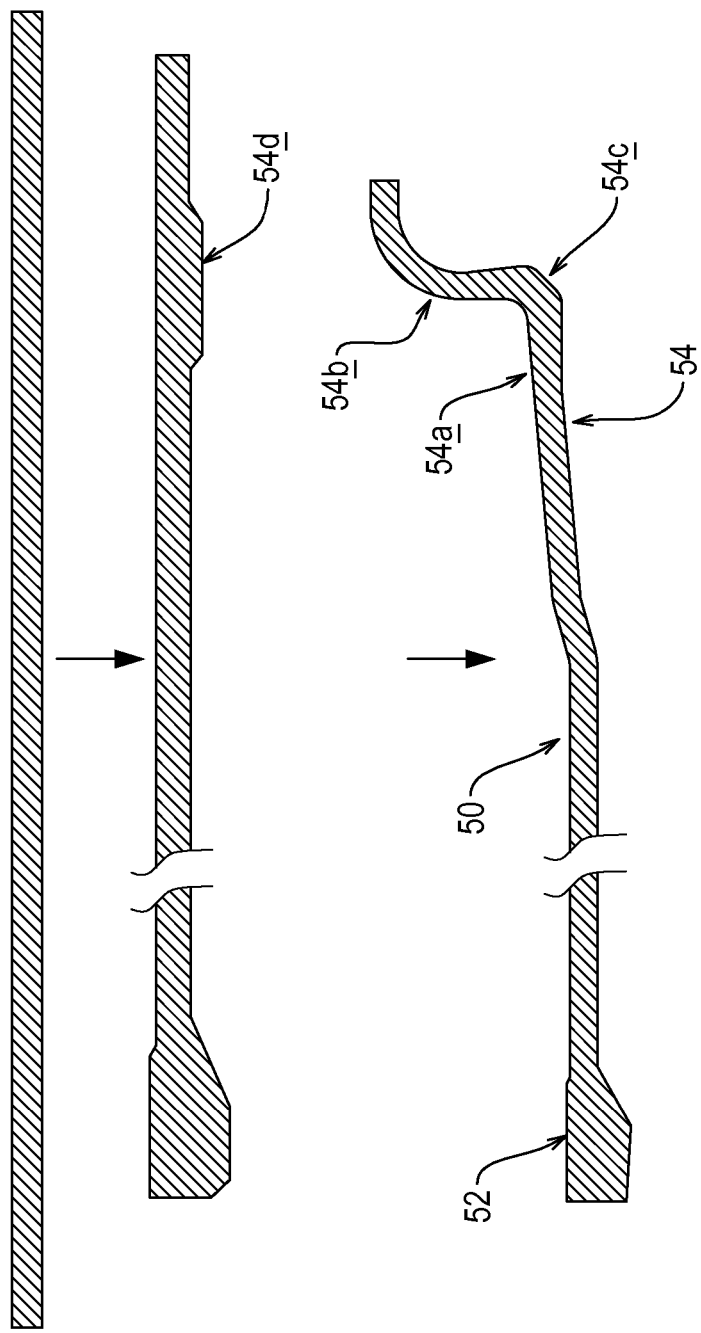
FIG. 7 illustrates possible modifications of the production process of FIG. 6.

Referring now to FIG. 7 of the drawings, this shows a modification of the method of FIGS. 5 and 6. The rim base again comprises integral centre band (50), gutter band (52) and back band (54) parts as shown in FIG. 5. In this case, however, the back band part 54 of the rim base has a locally-increased wall thickness where indicated at 54c, in the radiussed portion between the bead seat portion 54a and the flange portion 54b. To achieve this, in an intermediate manufacturing stage, after the edge region 52a of increased thickness has been hot upset forged, the region of the workpiece which is to form the radiussed portion 54c is itself hot upset forged (in different tooling from that used to hot upset forge the gutter band portion) to provide a region shown at 54d, of increased thickness. When the back band portion of the rim base is cold formed, the increased thickness region 54d of that part of the workpiece being cold formed gives rise to the increased wall thickness in the radiussed portion 54c. This enables the plate material from which the workpiece is made to be of slightly thinner material than that which would otherwise be necessary, the radiussed portion 54c deriving increased strength from its relatively-increased wall thickness.

Figure 8:
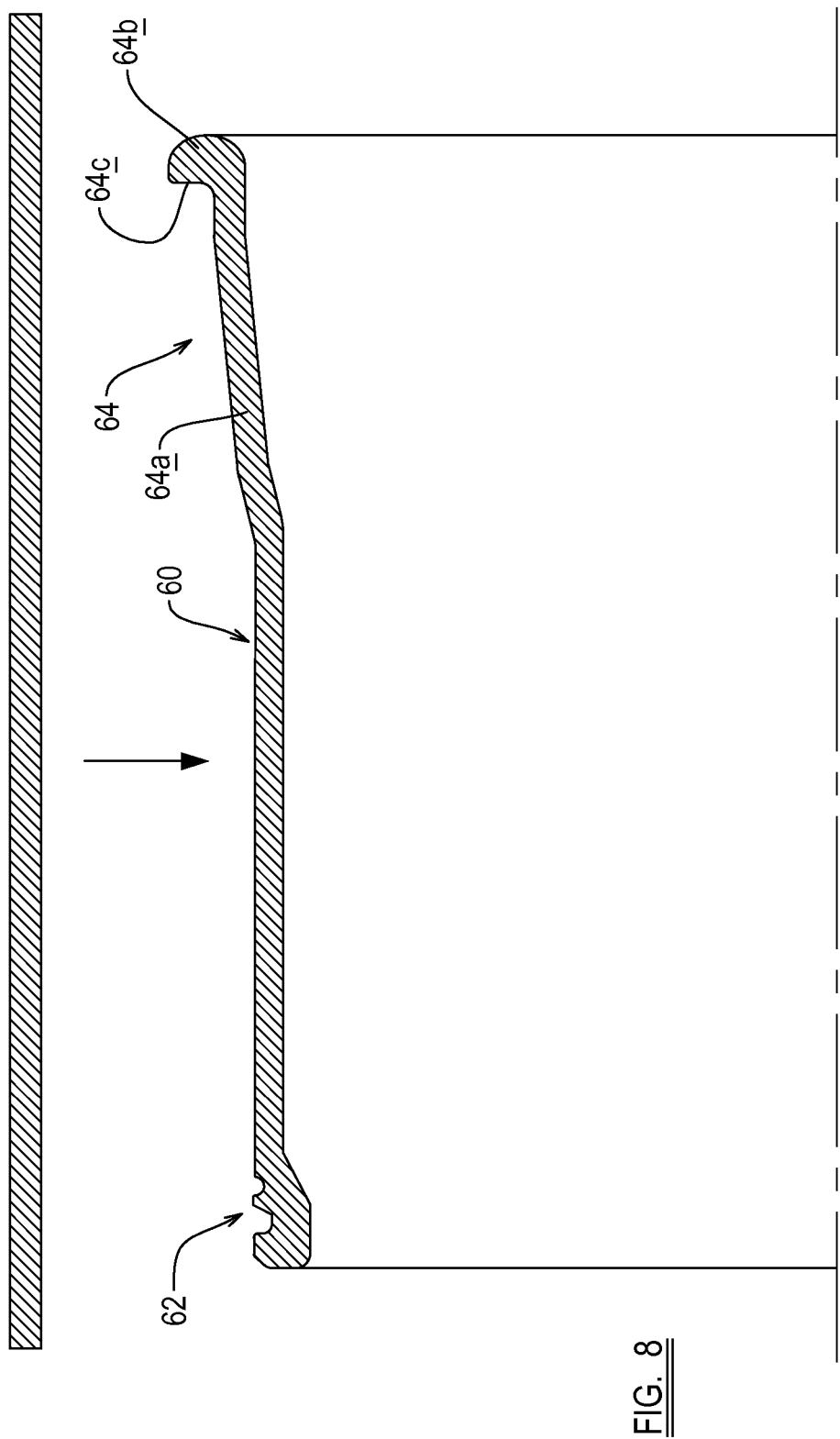
FIG. 8 is a cross sectional view of a yet a further embodiment of wheel rim base, made in accordance with the invention, for a five piece wheel.

Referring now to FIGS. 8 and 9 of the drawings these illustrate a rim base for a five piece wheel, manufactured in one piece and wherein both its gutter band and back band parts are manufactured utilising the method of the present invention. In FIG. 8, the rim base has a centre band part 60, gutter band part 62, and back band part 64, the last-mentioned part having a bead seat portion 64a and an abutment portion 64b with an abutment surface 64c.

With reference to FIG. 9 of the drawings, the manufacturing process for the rim base shown in FIG. 8 comprises, firstly, the manufacture of a hollow cylindrical workpiece from steel plate, as shown in FIG. 9A. One end portion of the workpiece is hot upset forged by the method of the invention to provide a portion 62a of increased thickness (FIG. 9B). The other end of the workpiece is upset forged by the method of the invention to provide the basic configuration of the back band portion 64 (FIG. 9C). Finally, the gutter band portion 62 is machined to its required final configuration (FIG. 9D).

Figure 10A:
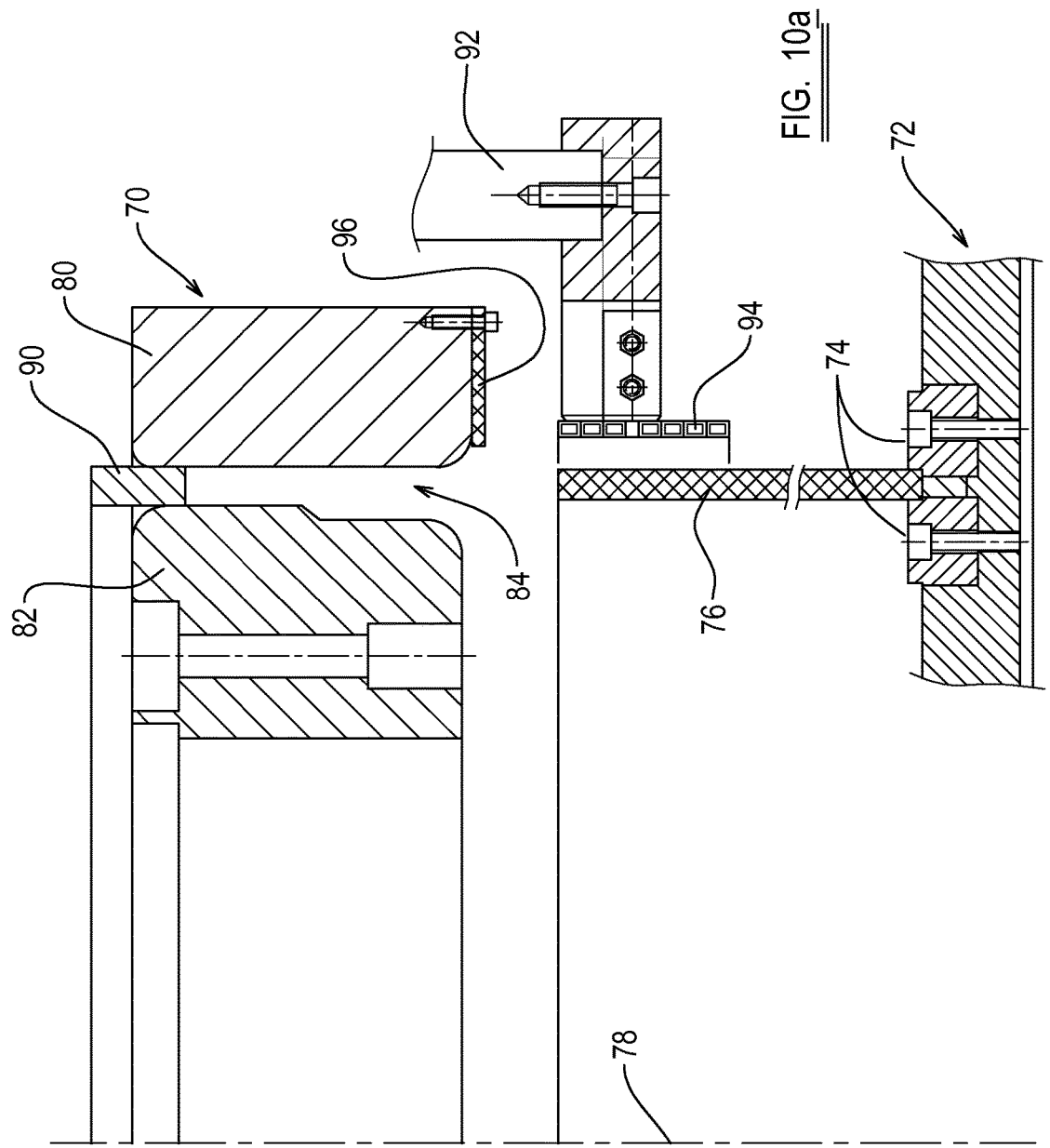
FIG. 10 illustrates tooling in accordance with the invention for manufacturing a gutter band part of the wheel rim base of FIG. 3, 4, 5 or 7, showing successive stages of operation thereof.

Referring now to FIGS. 10 and 11 of the drawings, these illustrate the hot upset forging process according to the invention. FIGS. 10A to 10E show, in cross section, part of a press tool set for operating on a workpiece to hot upset form a part thereof to the required configuration, namely a portion of increased wall thickness for forming the gutter band region of a rim base, as indicated at 52a in FIG. 6B or 62a in FIG. 8B.

A press whose size, force it can exert, operating speed, and control system make it capable of conducting the operations described hereafter is required. The tooling utilised in such a press comprises an upper part indicated generally at 70 and a lower part indicated generally at 72. The lower part 72 is a static base part of the tooling, and includes formations 74 for holding the workpiece which is indicated generally at 76, the central axis of the workpiece being indicated at 78. The upper part 70 of the tooling comprises an outer forming part 80 and an inner forming part 82 defining, between their facing surfaces, a forming cavity indicated generally at 84 and shown in greater detail in FIG. 11. The outwardly-facing surface of the inner forming part 82 is stepped, so that the cavity 84 comprises an upper portion 86, whose radial thickness is greater than the starting wall thickness of the workpiece, and a lower portion, of further increased radial thickness, 88. An ejector 90 moveable relative to the tool parts 80, 82 defines the upper limit of the cavity 84.

Held relative to the upper part 70 of the tooling, by a support illustrated diagrammatically at 92, there is an induction heating coil 94. The coil 94 is positioned so as to surround the workpiece 76 at a distance such that, when the coil is suitably electrically energised in known manner by a power supply, the adjacent part of the workpiece is heated to a suitable forming temperature. To avoid the need for providing the tooling in a press having a very large working height, the induction coil 94 is of necessity relatively close to the outer forming part 80 of the tooling, and in order to prevent the part 80 from being heated by operation of the induction heating coil 94, a copper shielding element 96 is provided between the bottom of the part 80 and the coil 94, the copper shielding element 96 being secured to the part 80. The shielding element also, mainly, ensures maximum energy transfer to the workpiece.

Successive stages of carrying out the method of the invention are as follows. As shown in FIG. 10A, with the workpiece 76 secured to the lower tool part 72 and extending upwardly therefrom, the upper tool part 70 is lowered until the induction heating coil 94 is aligned with the upper part of the workpiece, the coil then being electrically energised to cause heating of the workpiece. In a particular example of manufacturing a gutter band part for a wheel rim base, the region of the workpiece which is to be upset forged to increase its thickness, in a predetermined profile and for a predetermined length of the workpiece, the temperature of the respective part of the workpiece needs to be raised until it achieves an outside temperature of 1250° C. and an inside temperature of 1100° C. These temperatures are required to ensure that the gutter band portion can be correctly formed, without causing any deformation of the remainder of the workpiece which is to form an adjacent part of the rim base.

To avoid the possibility that local melting of the material of the workpiece might occur, particularly at the free edge of the workpiece, the induction heating coil may be moved upwardly and downwardly relative to the workpiece while it is energised, to ensure uniform heating until the required temperature of the workpiece is established. This also ensures a gradual transition between the gutter band part and the centre band part geometrically, and can increase the width of the portion of increased thickness if a wider gutter band is required. It also has the effect of interrupting any electromagnetic loops which might cause local or spot overheating in the workpiece.

Once the workpiece has been heated to the correct temperature, the induction heating coil is de-energised and the upper part 70 of the tool rapidly forced down onto the heated part of the workpiece. In this process, the ejector 90 is in the position in which it is shown in FIGS. 10A and 10B, closing-off the upper end of the upper, smaller thickness, cavity part 86. The outer wall surface of the workpiece initially may be spaced from the inner wall of the outer forming part 80 of the tool, and the end part of the workpiece is upset until its thickness is increased so that its radially innermost surface contacts the inner tool part 82 in the upper part 86 of the cavity 84. This condition is shown in FIG. 10B; at this stage the induction heating coil 94 is adjacent a lower part of the workpiece.

The upper tool part 70 is then raised to the position shown in FIG. 10C while the ejector is lowered relative to the upper tool part until it aligns with the shielding element 96, to eject the end portion of the workpiece from the upper cavity part 86, until the induction heating coil again aligns with the part of the workpiece which has undergone the first stage of upsetting to increase its thickness. Then, the ejector 90 is raised relative to the upper tool parts 80, 82 to its position shown in FIGS. 10C and 10D, to close the cavity 84 at the lower end of the smaller radial dimension upper cavity part 86. The induction heating coil is again energised until the upper part of the workpiece has been brought back to its forming temperature (possibly, again, with relative upwards and downwards movement between the coils and workpiece), and then the upper tool part 80, 82 is again forced rapidly over the heated part of the workpiece, shaping the end portion of the workpiece as shown in FIG. 10D to conform to the shape of the lower part 88 of the cavity 84. This gives the workpiece a sufficiently increased wall thickness to enable it to form the gutter band portion of the rim base, with the outwardly facing grooves therein machined subsequently to the forming process. The upper tool part is then raised from the position shown in FIG. 10D, with the ejector 90 ejecting the workpiece from the lower cavity part 88. The workpiece remains as shown in FIG. 10E.

In the above described forging operations, optimisation of the geometry of the respective parts of the cavity in the upper tool part 70 is required according to the shape of the parts which are required to be upset forged. In particular, it is important that the cavity should provide sufficient volume to enable the respective part of the workpiece to be forged to increase its thickness, but without causing any deformation of the remainder of the workpiece.

If the workpiece is to be used in a rim base for a three piece wheel as shown in FIG. 3 or a five piece wheel as shown in FIG. 4, it may subsequently be machined as required and circumferentially welded to a back band component as shown in FIG. 3 or FIG. 4. A back band component as shown in FIG. 4 may be manufactured by a hot upset forging process as described above with reference to FIGS. 10 and 11, using analogous tooling but with the difference that the tool cavity is shaped to form the abutment portion 46 at the end of the workpiece. Both components of the rim base would be appropriately machined prior to being welded together.

A rim base component made as described in relation to FIGS. 10 and 11 may thereafter be used to form a one-piece rim base as shown in FIG. 5 or FIG. 7. If it is to be used to make a rim base as shown in FIG. 5, the workpiece upset forged as above described may subsequently have its end opposite the portion which forms the gutter band part of the rim base cold formed to provide a flange formation as shown in FIG. 6c. Machining of the gutter band region to provide the outwardly facing grooves may be performed subsequent to such forming.

In the case of making a one-piece rim base as shown in FIG. 8, the workpiece manufactured as shown in FIG. 10 may be removed from the press having the tooling shown in FIGS. 10 and 11 and placed in the same or another press provided with tooling operable on the same principle as that shown in FIG. 11 but with tool parts shaped to form the abutment surface and adjacent bead seat part as shown in FIGS. 9c and 9d at 64. In particular, the principle of utilising an induction heating coil moveable with a tool part to bring it in a position to heat the required portion of the workpiece, which part is subsequently upset forged, may be utilised. The upset forging of the back band part 64 of the rim base may be carried out in two or more steps, with intermediate re-heating by the induction heating coil, as required.

It will be appreciated that the configurations of rim base above described, and the tooling and other elements used in the method of manufacture thereof, are illustrated by way of example only, and that detailed changes of configuration may be made within the scope of the invention.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of making at least a component for a rim base of a multi-piece wheel for a vehicle, comprising providing a workpiece of tubular configuration and hot upset forging the workpiece in press tooling to form a part thereof to a required configuration, wherein the method includes the steps of:
heating a portion of the workpiece to a forging temperature in situ in the press tooling;
upset forging the workpiece in a first upset forging operation in which the press tooling defines a first cavity having a first configuration, to increase a thickness defined by the portion of the workpiece to a first thickness, and to shape the portion of the workpiece to a first shape corresponding to the first cavity; and
upset forging the workpiece in a second upset forging operation in the press tooling subsequent to the first upset forging operation, wherein the press tooling in the second upset forging operation defines a second cavity having a second configuration different than the first configuration, to increase the thickness of the portion of the workpiece to a second thickness greater than the first thickness, and to shape the portion of the workpiece to a second shape corresponding to the second cavity different than the first shape.

2. A method according to claim 1 wherein the step of heating the portion of the workpiece is effected by induction heating.

3. A method according to claim 2 comprising holding the workpiece by a first part of the press tooling and supporting an induction heating element for movement with a second part of the press tooling relative to the first part of the press tooling.

4. A method according to claim 3 comprising moving the second part of the press tooling relative to the first part of the press tooling to bring the induction heating element to a position adjacent the portion of the workpiece to be formed, energising the induction heating element to heat the portion of the workpiece, and further moving the second part of the tooling relative to the first part to effect the upset forging of the portion of the workpiece.

5. A method according to claim 3 further comprising moving the induction heating element relative to the workpiece while heating is in progress.

6. A method according to claim 1 including heating the portion of the workpiece between the first and second upset forging operations.

7. A method according to claim 1 wherein the first and second upset forging operations utilise different portions of a forming formation in the press tooling.

8. A method according to claim 1 wherein the upset forging increases a wall thickness of the portion of the workpiece.

9. A method according to claim 8 wherein the portion of increased thickness of the workpiece is an edge portion, to provide a gutter band part of a rim base.

10. A method according to claim 8, wherein the portion of increased thickness provides reinforcement in a part of the workpiece formed to provide a flange formation.

11. A method according to claim 1 wherein the upset forging provides an abutment formation for a back band part of a rim base.

12. A method according to claim 11 further comprising forming a bead seat portion adjacent the abutment formation.

13. A method of making a rim base for a multi-piece wheel for a vehicle, comprising making a component by the method according to claim 1, and welding the component to at least one further component.

14. A method according to claim 13 wherein the first component is welded to a further component which is also made by the method of claim 1.

15. A method according to claim 13 wherein the components comprise a gutter band part and a back band part of a rim base.

16. A method of making a one-piece rim base for a multi-piece wheel for a vehicle, comprising making a component by the method of claim 9, and forming an opposite edge portion of the workpiece to provide a back band part of the rim base.

17. A method according to claim 16 wherein the opposite edge portion of the workpiece is cold formed.

18. A method according to claim 17 further comprising hot upset forging the workpiece to provide an increased wall thickness in a part thereof which is cold formed.

19. A method according to claim 16 wherein the opposite edge portion of the workpiece is formed by upset forging.

20. A method according to claim 19 wherein the respective edge portions of the workpiece are hot upset forged in separate press tool sets.

21. A rim base or a component for a rim base for a multi-piece wheel, made by a method according to claim 1.

22. A multi-piece wheel, having a rim base according to claim 21.

23. A method of making an article by hot upset forging a workpiece in press tooling, wherein the method includes at least the steps of:
- heating a portion of the workpiece to a forging temperature in situ in the press tooling;
- upset forging the workpiece in the press tooling in a first upset forging operation in which the press tooling defines a first cavity having a first configuration, to increase a thickness defined by the portion of the workpiece to a first thickness, and to shape the portion of the workpiece to a first shape corresponding to the first cavity; and
- thereafter again upset forging the workpiece in the press tooling in a second upset forging operation, wherein the press tooling in the second upset forging operation defines a second cavity having a second configuration different than the first configuration, to increase the thickness of the portion of the workpiece to a second thickness greater than the first thickness, and to shape the portion of the workpiece to a second shape corresponding to the second cavity different than the first shape.

24. A method according to claim 23 wherein the heating is induction heating.

* * * * *